(12) United States Patent
Maus

(10) Patent No.: US 7,179,429 B1
(45) Date of Patent: Feb. 20, 2007

(54) CATALYTIC EXHAUST-GAS PURIFICATION DEVICE AND ASSOCIATED COMPENSATING LAYER, IN PARTICULAR FOR MOTOR VEHICLES

(75) Inventor: Wolfgang Maus, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 741 days.

(21) Appl. No.: 09/632,248

(22) Filed: Aug. 3, 2000

Related U.S. Application Data

(63) Continuation of application No. PCT/EP99/00127, filed on Jan. 12, 1999.

(30) Foreign Application Priority Data

Feb. 3, 1998 (DE) ................................ 198 04 213

(51) Int. Cl.
 *B01D 50/00* (2006.01)
 *B01D 53/34* (2006.01)
 *B01J 8/02* (2006.01)

(52) U.S. Cl. ...................... 422/179; 422/171; 422/177; 422/180; 422/221

(58) Field of Classification Search ................ 422/171, 422/177, 179, 180, 221
 See application file for complete search history.

(56) References Cited

U.S. PATENT DOCUMENTS 4,344,922 A * 8/1982 Santiago et al. ............ 422/179
4,863,700 A   9/1989 Ten Eyck .................... 422/179
4,929,429 A * 5/1990 Merry ......................... 422/179
4,999,168 A   3/1991 Ten Eyck .................... 422/179
6,077,483 A * 6/2000 Locker et al. ............... 422/179

FOREIGN PATENT DOCUMENTS

| DE | 2 213 539 | 10/1973 |
| DE | GM 80 19 813 | 10/1980 |
| DE | 297 09 180 | 10/1997 |
| EP | 9 884 459 A2 | 12/1998 |

* cited by examiner

*Primary Examiner*—Alexa D. Neckel
(74) *Attorney, Agent, or Firm*—Laurence A. Greenberg; Werner H. Stemer; Ralph E. Locher

(57) ABSTRACT

The catalytic exhaust gas cleaning system and a corresponding compensation layer are especially suitable for automotive applications. The novel configuration reliably protects a so-called swelling mat from strongly pulsating streams of exhaust gases, even at very high ambient temperatures. A compensation layer which includes the swelling mat and an insulting mat is disposed between an outer housing and a honeycomb of an exhaust gas purification system. An edging is produced preferably by folding the insulating mat. The folder-over edge bead is thicker than the remaining inner area of the insulating mat. Next to the side of the inner area facing away from the honeycomb, the welling mat is arranged so that the thicker area of the edging of the insulating mat covers those edge areas of the swelling mat which are at risk of abrasion. The compensation layer preferably consists of a composite material which can be wound. The simple and effective construction is also suitable for use in devices within motor vehicle exhaust gas cleaning systems which are situated close to the engine, even when thin-walled-ceramic honeycombs are used.

17 Claims, 2 Drawing Sheets

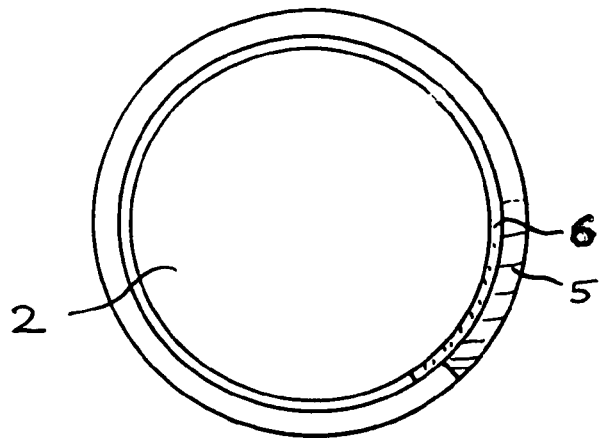
FIG. 3
FIG. 4
FIG. 5

CATALYTIC EXHAUST-GAS PURIFICATION DEVICE AND ASSOCIATED COMPENSATING LAYER, IN PARTICULAR FOR MOTOR VEHICLES

CROSS-REFERENCE TO RELATED APPLICATION

This is a continuation of copending international application PCT/EP99/00127, filed Jan. 12, 1999, which designated the United States.

BACKGROUND OF THE INVENTION

Field of the Invention

The present invention relates to a catalytic exhaust-gas purification device, in particular for motor vehicles. The device includes at least one monolithic ceramic honeycomb element in a metallic casing. A compensating layer is arranged between the casing and the honeycomb element. The compensating layer is formed of a swelling mat with border regions that are at risk from abrasion and an insulating mat with a border and an inner region, in particular for holding the monolithic honeycomb element in the metallic casing of the catalytic exhaust-gas purification device.

Exhaust-gas purification devices—which differ with regard to their construction and/or the type of catalytically active surface coating—are required for diesel-powered motor vehicles, where one of the concerns is the afterburning of soot, and for detoxifying the exhaust gases of gasoline engines. One significant problem in all cases is that there must be provided durable, secure and, in particular, shock-damped mounting, in a metallic casing, for fragile ceramic honeycomb elements of the type that are frequently used in exhaust-gas purification devices. The problem is further exacerbated by the fact that the casing expands much more than the honeycomb element when the temperature increases.

Particularly advantageous properties of the exhaust-gas purification devices are obtained when so-called swelling mats are used in a compensating layer between the casing and the honeycomb element. This is so because it is possible in this way to absorb the above-described large differences in thermal expansion particularly advantageously. The swelling mat is capable of swelling up to fill the cavities which form due to the differences in the behavior of the casing and the honeycomb element and due to manufacturing tolerances and thus ensures secure mounting over a long period of operation. Swelling mats generally contain particles of mica, which, to the extent that there is sufficient space around them, absorb water and swell in the process.

It is a disadvantage of swelling mats of that kind, and indeed of mats based on aluminum silicate fiber that are preferably used in such cases, that they are abraded very easily by pulsating exhaust-gas flows.

In order to prevent such abrasion erosion, a number of solutions have been proposed that deal with the problems which arise from pulsating exhaust gases. German utility model DE 80 19 813 U1, for example, describes the integration of a corrugated wire mesh mat into the swelling mat for the purpose of stabilizing such swelling mats. To protect the swelling mat from abrasion at the ends of the honeycomb element, gas-sealing rings are to be provided at the ends of the honeycomb element to cover the gap filled by the swelling mat.

Another solution for providing protection against abrasion proposes so-called shielding funnels made of metal, which are arranged at a minimum distance in front of the end of a ceramic honeycomb element. The minimum distance is determined by thermally induced changes in length. An advantageous development of that solution provides shielding funnels made of ceramic material, whose ends then rest directly against the ceramic honeycomb element since the coefficients of expansion are the same.

German utility model DE 297 09 180 U1 describes a mounting mat with a ply of intumescent material, that is to say presumably having a swelling agent. That mat, for the purpose of protecting it against abrasion, is provided with at least one insert of elastic, flexible material which is not intumescent or is less so.

Since, furthermore, honeycomb elements in exhaust-gas systems heat up to 900° C. and more in operation, and components arranged in the vicinity of the exhaust-gas purification device should be protected from this high temperature, it is also known practice to provide a thermally insulating layer between the casing and the honeycomb element.

That thermally insulating layer can be a layer of air, which insulates the casing by virtue of the low heat conduction and heat convection properties of air against the high temperatures which occur in the honeycomb element during the use of the catalytic exhaust-gas purification device.

Alternatively, or in addition, to insulation by a layer of air, the prior art has also known of an insulating layer composed of a ceramic material. Those provides as well utilize the thermal insulation of the external casing from the honeycomb element by virtue of the low heat conduction and heat convection properties of the ceramic materials provided. Since the above-mentioned swelling mats for holding honeycomb elements release water at a very high ambient temperature of, for example, over 800° C. and shrink in the process, with the result that the honeycomb element may come loose in the casing, swelling mats must be thermally insulated from the honeycomb element in certain exhaust-gas purification devices subject to high stresses. For that purpose it has already been known first of all to provide the honeycomb element with a so-called insulating mat, that is to say with a thermally insulating layer, preferably made of ceramic material, and only then to surround it with a swelling mat.

There still exists the problem of protecting the swelling mat from abrasion due to pulsating exhaust-gas flows and, according to the prior art described above, protection can only be adequately ensured by means of complicated covers and/or of integral reinforcements or inserts.

SUMMARY OF THE INVENTION

The object of the invention is to provide a catalytic exhaust-gas purification device and an associated compensating layer which overcome the above-noted deficiencies and disadvantages of the prior art devices and methods of this kind, and which achieve, with a simpler construction than those proposed in the prior art, reliable shielding of the swelling mat from strongly pulsating exhaust-gas flows, even at very high ambient temperatures.

With the above and other objects in view there is provided, in accordance with the invention, a catalytic exhaust-gas purification device, in particular for motor vehicles, comprising:

a casing;

a monolithic ceramic honeycomb element mounted in the casing;

a compensating layer disposed between the casing and the honeycomb element, the compensating layer comprising
   a swelling mat with border regions at risk from abrasion;
   an insulating mat having a border and an inner region;
   the border of the insulating mat having a thicker region at least at one end of the honeycomb element than at a remaining the inner region; and
   the swelling mat being disposed adjacent a side of the inner region of the insulating mat facing away from the honeycomb element and the thicker region of the border of the insulating mat covering the border regions of the swelling mat at risk from abrasion.

Since the insulating mat has a thicker border in the region of at least one end of the honeycomb element than in the remaining inner region, a swelling mat that is disposed in such a way near to the side of the inner region of the insulating mat which faces away from the honeycomb element that the thicker region of the border of the insulating mat covers the border regions of the swelling mat, which are at risk from abrasion, the swelling mat is advantageously shielded from strongly pulsating exhaust gases and thermally insulated in terms of heat conduction and heat convection.

Moreover, any cavities which remain in production or form during operation between the casing and the honeycomb element are advantageously sealed by the swelling mat, the swelling mat sealing cavities adjacent to it by swelling when it absorbs water. This ensures durable, secure and, in particular, shock-damped mounting of the fragile ceramic honeycomb element.

In accordance with an added feature of the invention, the insulating mat is folded over toward the casing at the border, forming the thicker region of the border.

In accordance with an additional feature of the invention, the insulating mat contains a ceramic material with very low heat conduction and heat convection properties. In an advantageous refinement, the insulating mat contains long ceramic fibers which are preferably contained in the thicker region of the border.

In accordance with a particular feature of the invention, the swelling mat contains a ceramic material adapted to seal adjacent cavities by swelling upon absorbing water. This feature ensures the above-noted secure mounting of the honeycomb.

In accordance with another feature of the invention, the compensating layer, i.e., the thicker-bordered insulating mat and the swelling mat, is formed of a composite material. This is a particularly advantageous refinement in terms of production. This material is preferably capable of being wound at least once or else, in the case of higher requirements on the insulation, more than once around a honeycomb element, for example, in the circumferential direction. As an alternative, the compensating layer designed as a composite material can be assembled from prefabricated cylindrical or oval segments or segments that are matched to some other contour of the casing, in particular segments in the form of half shells.

In accordance, therefore, with a concomitant feature of the invention, the compensating layer is circumferentially wound at least once around the honeycomb element.

With the above and other objects in view there is also provided, in accordance with the invention, a compensating layer, comprising:

an insulating mat with a border and an inner region, the inner region having a given thickness and the border of the insulating mat being thicker than the inner region at least in parts thereof; and a swelling mat with border regions at risk from abrasion, the swelling mat being disposed adjacent the inner region of the insulating mat with the thicker parts of the border covers the border regions of the swelling mat at risk from abrasion.

Other features which are considered as characteristic for the invention are set forth in the appended claims.

Although the invention is illustrated and described herein as embodied in a catalytic exhaust-gas purification device and associated compensating layer, in particular for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic sectional view of a compensating layer wrapped around a cylindrical honeycomb body, the section taken along the line III in FIG. 1;

FIG. 4 is a diagrammatic sectional view of a semi-circular pre-shaped compensating layer; and FIG. 5 is a diagrammatic sectional view of a semi-oval pre-shaped compensating layer.

DESCRIPTION OF THE PREFERRED EMBODIMENTS

Figure 1:
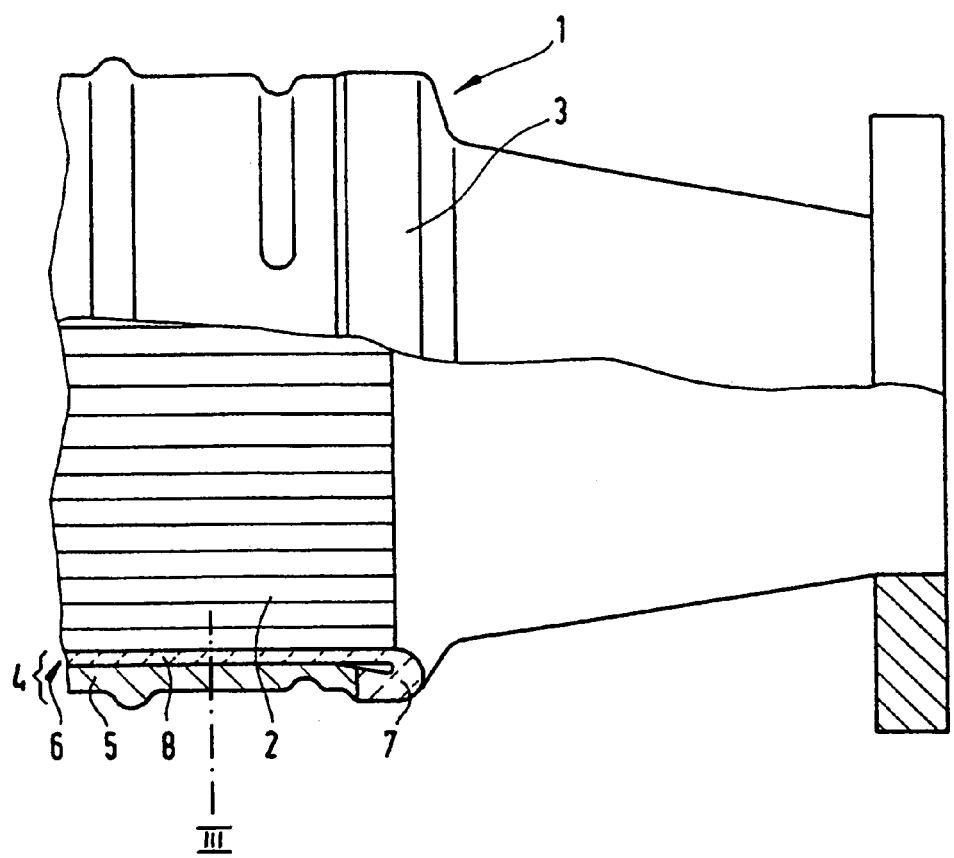
FIG. 1 is a partial sectional view of a portion of an exhaust-gas purification device.

Referring now to the figures of the drawing in detail and first, particularly, to FIG. 1 thereof, there is seen a partly sectioned portion of an exhaust-gas purification device 1 according to the invention. A casing 3 holds a honeycomb element 2, which is wrapped in a compensating layer 4.

The honeycomb element 2 is preferably a monolithic ceramic honeycomb element, in particular one made of so-called thin-walled ceramic. However, honeycomb elements 2 constructed from thin sheet metal layers can also be held in a similar manner. In either case, the object is to provide thermal insulation relative to the casing 3, which is preferably a metallic body.

In the exemplary embodiment under consideration, retention and insulation is achieved by means of a compensating layer 4 comprising a ply of ceramic material, preferably a swelling mat 5, and another, thermally insulating layer, a so-called insulating mat 6. Together, these two plies form the compensating layer 4 which, on the one hand, holds the honeycomb element 2 securely in the casing 3 and, on the other hand, ensures very good thermal insulation. The insulating mat 6 is composed of a ceramic material and has very low thermal conductivity and thus prevents heat conduction and convection from the honeycomb element 2 to the casing 3. The swelling mat 5 contains particles of mica, which, to the extent that there is sufficient space around them, absorb water and swell in the process. In other words, the swelling mat 5 fills the cavities which form due to the differences in the behavior of the casing 3 and the honeycomb element 2 and due to manufacturing tolerances. This ensures that the honeycomb element 2 is mounted securely in the casing 3 over a long period of operation. Swelling mats 5 and insulating mats 6 of ceramic material are typically fiber mats, as known from the prior art for holding ceramic honeycomb elements 2, with a thickness as required for compensating manufacturing tolerances of the external casing 3 and the honeycomb element 2 and for holding over a long period of operation. It should be pointed out that a number of compensating layers 4 and/or, alternatively, merely additional plies of the thermally insulating layer 6, which follow one another radially, can be provided to improve thermal insulation, especially if the exhaust-gas purification device 1 is subjected to very high operating temperatures. Such extreme operating temperatures are particularly prevalent where the device is disposed in close vicinity to the exhaust outlet of a combustion engine.

It has been found that pulsating hot exhaust gases abrade the swelling mats 5 containing particles of mica. A safeguard against this is provided in the region of at least one end of the honeycomb element 2, preferably in the region of both ends of the honeycomb element 2. For this purpose, the inherently very abrasion-resistant ceramic insulating layer 6 is folded over toward the casing 3, i.e. a thick border is produced, covering the border regions of the swelling mat which are at risk from abrasion. It is particularly advantageous for the production of exhaust-gas purification devices 1 according to the invention if the compensating layer 4 constructed in this way is designed as a composite material.

Figure 2:
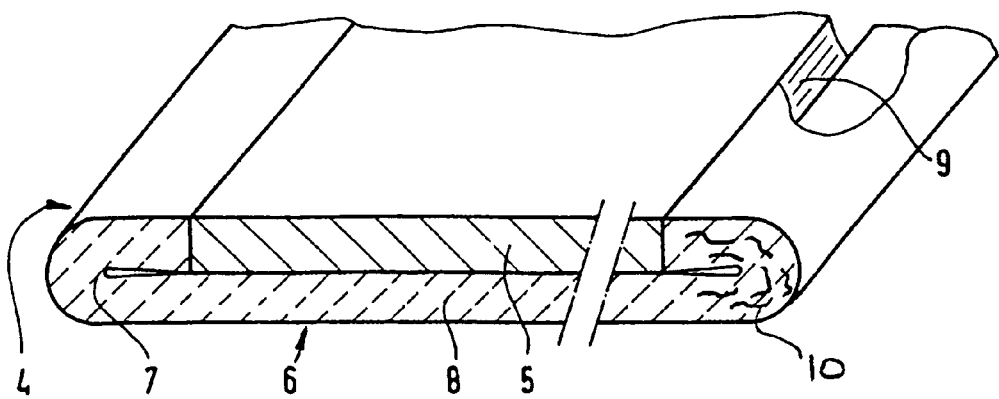
FIG. 2 is a partly broken-away, perspective sectional view of a compensating layer in the form of a composite material comprising a swelling mat and an insulating mat.

Referring now to FIG. 2, there is shown a compensating layer 4, which is constructed as a composite material comprising an insulating mat 6 and a swelling mat 5. The composite can preferably be wound at least once around the honeycomb element 2 in the circumferential direction. In a non-illustrated alternative embodiment, the compensating layer 4, again constructed as a composite material, is assembled from prefabricated cylindrical (FIG. 4) or oval segments (FIG. 5), or segments that can be matched to some other contour of the casing 3, in particular segments in the form of half shells (FIG. 4). The insulating mat 6 has an inner region 8 and a border 7. If the insulating mat 6, that is to say the thermally insulating layer, is composed of long ceramic fibers 10, at least in the thicker region of its border 7, it is not very susceptible to abrasion by pulsating exhaust gases and the protection provided by the thicker region of the border 7 for the border regions 9 of the swelling mat 5 which are at risk from abrasion is adequate.

FIG. 3 illustrates a composite formed of the mats 6 and 5 wrapped around a honeycomb body 2. The section of FIG. 3 may be taken along the line III in FIG. 1.

The present invention is distinguished by a particularly simple and, at the same time, effective construction and is suitable even for applications close to the engine in catalytic exhaust-gas purification devices 1 of motor vehicles. At the same time, it allows secure mounting of honeycomb elements 2, simultaneously provides good thermal insulation of the honeycomb element 2 in the casing 3, and protects that ply 5 of the compensating layer 4 which contains the swelling material adequately against abrasive erosion by pulsating exhaust-gas flows.

I claim:

1. A catalytic exhaust-gas purification device, comprising:
   a casing;
   a monolithic ceramic honeycomb element mounted in said casing;
   a compensating layer disposed between said casing and said honeycomb element and wound around said honeycomb element, said compensating layer including:
      a swelling mat with border regions at risk from abrasion;
      an insulating mat having a border and an inner region;
      said border of said insulating mat having a thicker region at least at one end of said honeycomb element than at said inner region; and
      said swelling mat being disposed adjacent a side of said inner region of said insulating mat facing away from said honeycomb element and said thicker region of said border of said insulating mat covering said border regions of said swelling mat at risk from abrasion.

2. The catalytic exhaust-gas purification device according to claim 1, wherein said thicker region of said border is a fold toward said casing.

3. The catalytic exhaust-gas purification device according to claim 1, wherein said insulating mat contains a ceramic material.

4. The catalytic exhaust-gas purification device according to claim 1, wherein said swelling mat contains a ceramic material with adjacent cavities, said ceramic material being adapted to seal said adjacent cavities by swelling upon absorbing water.

5. The catalytic exhaust-gas purification device according to claim 1, wherein said compensating layer is formed of a composite material.

6. The catalytic exhaust-gas purification device according to claim 5, wherein said compensating layer is circumferentially wound at least once around said honeycomb element.

7. The catalytic exhaust-gas purification device according to claim 5, wherein said compensating layer is assembled from prefabricated segments.

8. The catalytic exhaust-gas purification device according to claim 7, wherein said segments are selected from the group consisting of cylindrical segments, oval segments, and half shells.

9. The catalytic exhaust-gas purification device according to claim 7, wherein said segments are matched to a contour of said casing.

10. In combination with a honeycomb element, a compensating layer to be wound around the honeycomb element, comprising:
    an insulating mat with a border and an inner region, said inner region having a given thickness and said border of said insulating mat being thicker than said inner region at least in parts thereof; and
    a swelling mat with border regions at risk from abrasion, said swelling mat being disposed adjacent said inner region of said insulating mat with said thicker parts of said border covers said border regions of said swelling mat at risk from abrasion.

11. The compensating layer according to claim 10, wherein said swelling mat and said insulating mat together form a composite for holding a monolithic honeycomb element in a metallic casing of a catalytic exhaust-gas purification device.

12. The compensating layer according to claim 10, wherein said thicker region of said border of said insulating mat is a fold toward said casing.

13. The compensating layer according to claim 10, wherein said insulating mat contains a ceramic material with very low heat conduction and heat convection properties.

14. The compensating layer according to claim 10, wherein said swelling mat contains a ceramic material adapted to swell upon absorbing water.

15. The compensating layer according to claim 10, wherein said compensating layer is formed of a composite material.

16. The compensating layer according to claim 15, wherein said compensating layer is assembled from prefabricated segments.

17. The compensating layer according to claim 15, wherein said segments are selected from the group consisting of cylindrical segments, oval segments, and half shells.

* * * * *